United States Patent [19]

Krivoshlykov

[11] Patent Number: 5,479,542

[45] Date of Patent: Dec. 26, 1995

[54] ALL-FIBER IN LINE OPTICAL ISOLATOR

[75] Inventor: Sergej Krivoshlykov, Moscow, Russian Federation

[73] Assignee: CeramOptec Industries Inc., East Longmeadow, Mass.

[21] Appl. No.: 257,347

[22] Filed: Jun. 9, 1994

[51] Int. Cl.⁶ .................................................. G02B 6/26
[52] U.S. Cl. ................................. 385/30; 385/9; 385/41
[58] Field of Search ................................. 385/27, 28, 29, 385/30, 41, 49, 9, 8; 250/227.14

[56] References Cited

U.S. PATENT DOCUMENTS

| | | | |
|---|---|---|---|
| 4,268,116 | 5/1981 | Schmadel et al. | 385/30 |
| 4,342,499 | 8/1982 | Hicks, Jr. | 385/30 |
| 4,471,219 | 9/1984 | Giallorenzi | 250/227.14 |
| 4,775,216 | 10/1988 | Layton | 385/30 |
| 4,795,233 | 1/1989 | Chang | 385/30 |
| 4,842,358 | 6/1989 | Hall | 385/30 |

Primary Examiner—Rodney B. Bovernick
Assistant Examiner—John Ngo
Attorney, Agent, or Firm—Bolesh J. Skutnik; Kenneth Glynn

[57] ABSTRACT

The present invention is directed at an all-fiber in line isolator. The basic isolator includes a monomode optical fiber, a multimode waveguide, a coil or other traditional means to generate a magnetic field, and a fiber block or other traditional means to couple the fiber to the waveguide. In one embodiment, the fiber has a core and a cladding, and maintains a circular state of light polarization. The fiber has a coupling region where the cladding is partially removed. The waveguide evanescently couples to the fiber along the coupling region. The waveguide has magneto-optical properties such that applying a magnetic field along it causes backward propagating light to transfer to the waveguide with minimal disturbance to forward propagating light. Other embodiments using birefringent optical fibers are disclosed as well.

19 Claims, 3 Drawing Sheets

ALL-FIBER IN LINE OPTICAL ISOLATOR

BACKGROUND OF THE INTENTION

1. Field of the Invention

The invention relates to an optical fiber device for use in communication and sensors. The device allows transmission of a light signal through an optical fiber in one direction, but prevents its propagation in the opposite direction.

2. Information Disclosure Statement

Optical fiber components and sensors have become increasingly more important for effectively transmitting and processing signals in optical communication systems and many different optical fiber devices. Optical fiber systems essentially consist of at least one light transmitting optical fiber, a signal processing or sensor component, and a coherent radiation source (a laser). One of the most important tasks of many optical fiber systems is to prevent the light signal from reflecting back to the laser source. The properties of a laser can be greatly influenced by this undesired signal. This problem is avoided using an isolator in the optical fiber circuit to transmit the light in one direction, but prevent its propagation in the opposite direction.

A frequently used optical fiber isolator consists of a bulk magneto-optical crystal affected by a magnetic field. The isolator is placed between two appropriately adjusted polarizers and optically connected between an interrupted optical fiber (see e.g., *Laser Focus* v.14, No .11, p. 52 (1978)). The use of an isolator in an integrated optical design which employs a waveguide is also known. The waveguide is produced from a magneto-optical film instead of a bulk crystal which reduces the magnitude of the control fields required (see e.g., U.S. Pat. No. 4,859,013).

Although these isolators are effective, they face several shortcomings. Traditionally, when using isolators of this type, the optical fiber is interrupted and the isolator spliced in line using butt-joint connections. The need to interrupt the optical fiber circuit and the optical losses associated with such an interruption are the main disadvantage of many known optical isolators. Another disadvantage is that these isolators are designed for a specific wavelength, and it is difficult to change their properties quickly when switching to another light wavelength.

All-fiber in-line isolators which employ Faraday rotation in a coil fabricated from birefringent monomode fiber placed in a magnetic field (see *J. Lightwave Techn.* v.27 p.56 (1984)) are also burdened with the need for external polarizers operating at some specific wavelength. A new kind of all-fiber in-line component based on an evanescent coupling between a single-mode fiber and a multimode planer waveguide overlay has recently been investigated and used to design an all-fiber in line wavelength selective element and intensity modulator (see *Electronics Lett.* V. 28, p. 1364 (1992)). This device, however, cannot perform isolation functions.

SUMMARY OF THE INVENTION

The present invention is directed at providing a new and highly effective tunable all-fiber in line optical isolator. One object of the invention is to perform the isolation function without interrupting the optical fiber line. To accomplish this, the device evanescently couples the light propagating in a polarization maintaining monomode optical fiber with a high refractive index multimode planar or rib type waveguide.

It is another object of this invention to provide a device which can be quickly tuned to compensate for varying wavelengths of laser light. To perform this function, the waveguide comprises a material which exhibits magneto-optical and possibly electro-optical properties. A magnetic field is generated along the waveguide which alters the refractive indices for forward and backward propagating light. In one particular embodiment, electrodes are used to generate an electric field across the waveguide to provide for even greater control. Therefore, by using these fields, a user can effectively control the points at which the device isolates and transmits.

BRIEF DESCRIPTION OF THE DRAWINGS

The present invention, its advantages and objects will be more fully understood when the specifications herein is taken in conjunction with the appended drawings hereto, wherein.

DETAILED DESCRIPTION OF THE PRESENT INVENTION

Figure 1:
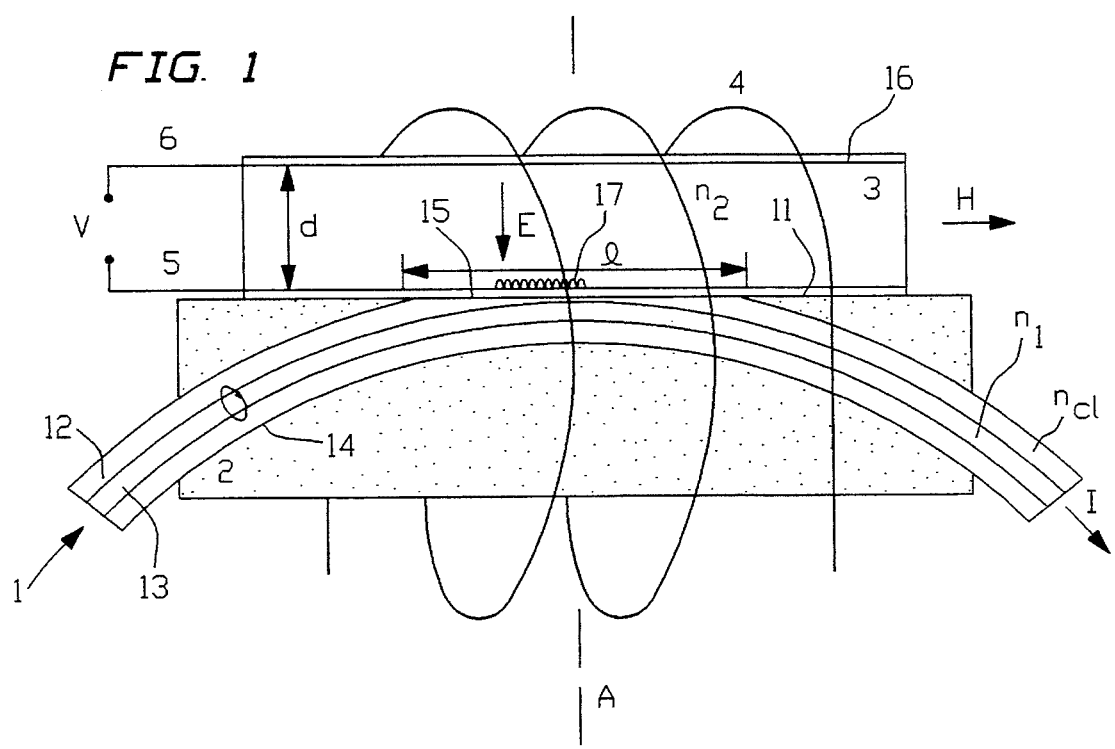
FIG. 1 shows a schematic of an all-fiber in line optical isolator based on the fiber maintaining a circular polarization of light.

FIGS. 1 shows one particular embodiment of the present invention. A fiber 1 has a core 13 having a graded refractive index $n_1$, and a cladding 12 having a refractive index of $n_{cl}$. Fiber 1 guides laser light in single mode with a propagation constant of $\beta_o$, and is manufactured to maintain a circular state of light polarization. For example, fiber 1 maintains a forward circular polarization as depicted in FIG. 1.

Fiber 1 is held in place by a coupling means 2. In this embodiment, coupling means 2 is a special fiber block having a V-groove 14 which is shaped to provide a large radius bending of the fiber. Using a fiber block with a V-groove is well known in the art of butt-joining two fibers, fabricating all-fiber in line polarizers, and using X-type couplers for monomode fibers (see, e.g., J. Dakin & B. Culshaw, *Optical fiber sensors: Principles and Components* (Artech House 1988)). It can be fabricated, for example, with the help of the silicon V-groove technology. The fiber block is polished to produce a polished surface 11 and to remove a part of cladding 12 from fiber 1. By removing this cladding, a coupling region 15 of length l is formed along fiber 1. The thickness of the remaining cladding, i.e., the distance between the core/cladding boundary of the fiber and polished surface 11, is only a few microns.

A waveguide 3 overlays the fiber block and fiber 1 along the polished surface 11. Waveguide 3 is a multimode type, possessing magneto-optical and, possibly, electro-optical properties, and having a thickness d, a refractive index $n_2$ greater than $n_{cl}$, and a propagation constant $\beta_n$ for its highest order mode. A crystal of bismuth silicate is an example of a possible waveguide material.

Figure 2:
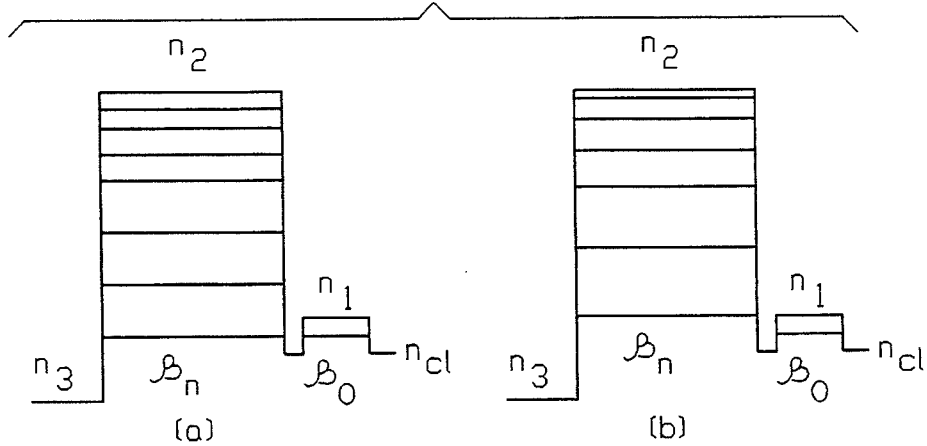
FIG. 2 shows the refractive index distribution in the cross section A of the system.
Figure 3:
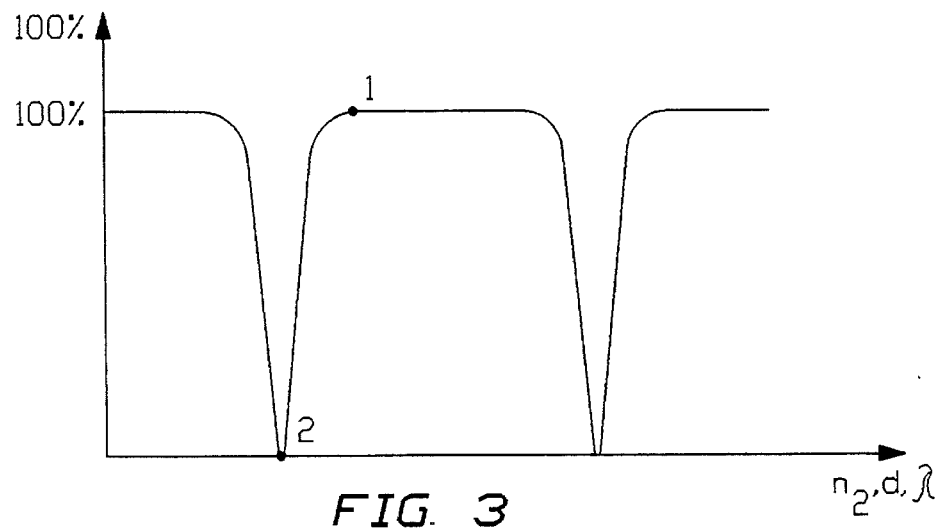
FIG. 3 shows the intensity of light transmitted through the isolator as a function of refractive index of the multimode waveguide overlay $n_2$, its thickness d, and the wavelength $\lambda$ of the light.

The refractive index profile of the composite system consisting of a waveguide 3 and fiber 1 in cross section A of FIG. 1 is shown schematically in FIG. 2 together with propagation constants of waveguide 3 and fiber 1. If the propagation constant $\beta_o$ of fiber 1 is matched to propagation constant $\beta_n$ of waveguide 3 as it is shown in FIG. 2(a), then the light transfers from fiber 1 to waveguide 3. If, however, the propagation constants are not matched, then all the light energy remains in the fiber. As a result, the intensity, I, of the light transmitted by the fiber, shows typical resonance-like behavior as a function of the waveguide's refractive index $n_2$, its thickness d, and the wavelength $\lambda$ of the light (see FIG. 3) since the mode propagation constant $\beta_n$ is a function of these parameters. Referring to FIG. 3, point 2 indicates an isolating point where all the light energy transfers from fiber 1 to waveguide 3. Point 1 indicates a transfer point where all the light energy remains in fiber 1. The device can be tuned to a specific transfer or isolating point by either polishing waveguide 3 to a certain thickness, varying the refractive index $n_2$, or varying the wavelength $\lambda$.

A magnetic field means 4 generates a magnetic field H about waveguide 3 and coupling region 15. In this embodiment, magnetic field means is an electrical coil, however, other means are possible. Because of the Faraday effect in magnetic field H, the magneto-optical multimode waveguide 3 exhibits different magnitudes of refractive index $n_2+$ and $n_2-$ for the circularly polarized light propagating in a forward and backward direction respectively. The refractive indices $n_2+$ and $n_2-$ can be varied by the field H such that transfer point 1 corresponds to forward propagating light, and isolation point 2 corresponds to backward propagating light. Therefore, the magneto-optical properties of waveguide 3 can be adjusted so that the device works as an isolator. The present invention can change the direction of light transfer by simply changing the direction of the controlling magnetic field.

Tuning the device to an appropriate transmitting point and isolating point depending on the wavelength $\lambda$ can also be conveniently and quickly realized by utilizing the electro-optical properties of waveguide 3. To this end, in one preferred embodiment, a pair of thin transparent electrodes 5 and 6 are embedded in waveguide 3 as shown in FIG. 1. An electric field E is produced across waveguide 3 when a control voltage V is applied across electrodes 5 and 6. Due to the electro-optical effect the refractive index changes.

Figure 4:
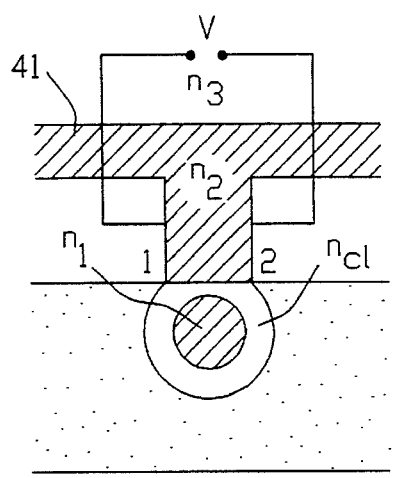
FIG. 4 shows the fiber with a polished cladding and the rib multimode waveguide overlay.

In the embodiment of FIG. 1, waveguide 3 is planar, however, other preferred embodiments exist. For example, a rib waveguide 41, as shown in FIG. 4, may be desirable for certain applications. Rib waveguide 41 requires less voltage V to generate field E because of its narrower width. Furthermore, rib waveguide 41 has a better transverse field confinement compared to a planar waveguide.

Figure 5:
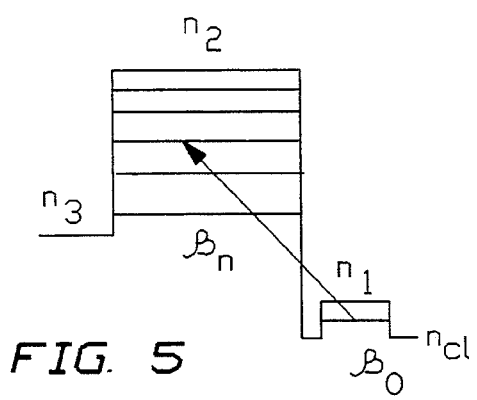
FIG. 5 shows the refractive index distribution in the case when refractive index $n_3$ of the material over the multimode waveguide is greater than that of the fiber cladding.

If the refractive index $n_3$ of a material 16 over waveguide 3 is greater than refractive index $n_{cl}$ of cladding 12 (as shown in FIG. 5) due to technical reasons, then a grating 17 can be used (as shown in FIG. 1). Grating 17, located on coupling region 15, is fabricated to match propagation constant $\beta_o$ to propagation constant $\beta_n$. Grating 17 may also be useful if it is desirable to switch from one operating mode in the multimode waveguide to another in order to vary the properties of a particular isolator device as shown in FIG. 5.

Fibers maintaining a circular state of polarization of the light used in this isolator device are well known. They can be fabricated, for example, by twisting a monomode fiber in such a way as to induce tensions in the fiber which creates a difference in propagation constants for modes with forward and reverse circular polarizations. This prevents a coupling between these two polarization states. In some practical applications, another type of polarization maintaining monomode fiber is used, namely the birefringent fiber. These fibers are characterized by an elliptic core or a PANDA-type configuration. Such fibers were designed to transmit the light with a linear state of polarization. The present invention may easily be modified to incorporate these fibers.

Figure 6:
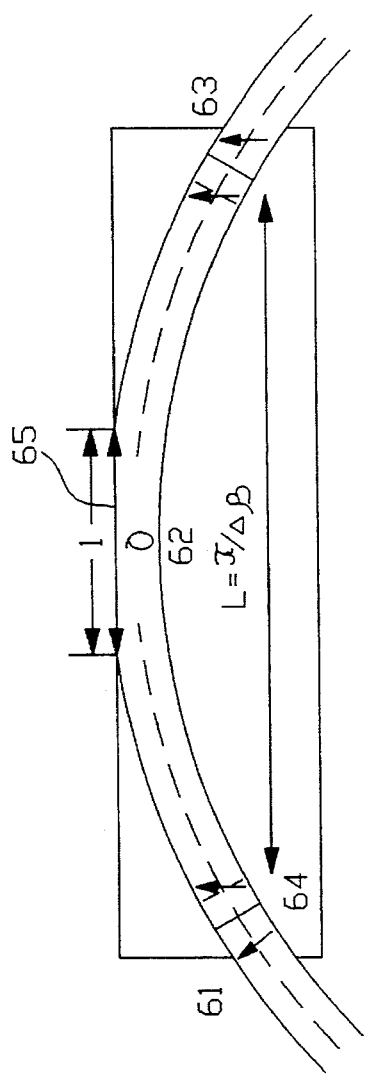
FIG. 6 shows an embodiment which facilitates the transformation of polarization from a linear to a circular state and then back again to a linear state using birefringent fibers.

The modification is shown in FIG. 6. Three sections from the same birefringent monomode fiber—an input fiber 61, an intermediate fiber 62 and an output fiber 63—are butt-joined together with the help of V-groove technology in a coupling means 64. A birefringement fiber is characterized by two orthogonal axis of symmetry corresponding to the two orthogonal polarization states which are maintained as the light propagates through the fiber. Each fiber has a specific relative orientation of its polarization axis of symmetry, and intermediate fiber 62 has a polarization beat length L. The axis of symmetry of intermediate fiber 62 is turned over a $\pi/4$ angle with respect to the axis of symmetry of input fiber 61. The axis of symmetry of output fiber 63 is turned over a $\pi/2$ angle relative the axis of the input fiber 61. If length l is chosen to be equal to $\pi/\Delta\beta$, wherein $\Delta\beta$ is the difference between the propagation constants corresponding to two orthogonal states of polarization of the birefringent fiber, then intermediate fiber 62 has a circular state of polarization in its middle. Parameters of the birefringent fiber must be chosen in such a way that beat length L is much greater than the length l of the coupling region 65 (see FIG. 6).

Figure 7:
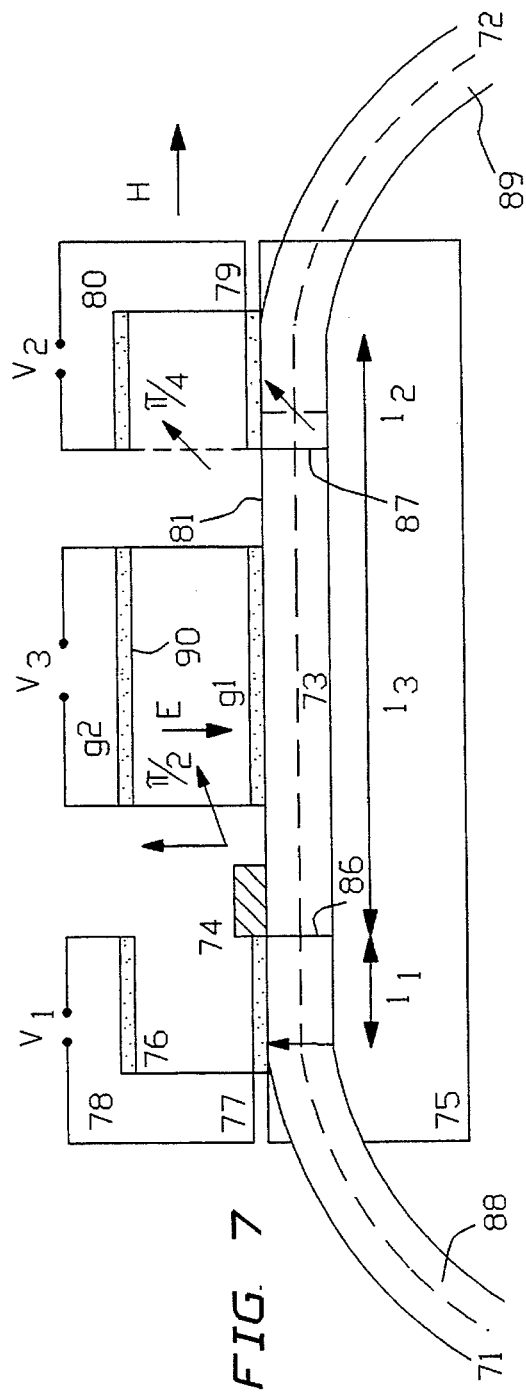
FIG. 7 shows another embodiment using birefringent fibers.

Another embodiment of the present invention also incorporates birefringent fibers. As shown in FIG. 7, this embodiment employs a coupling means 75 (in this embodiment a fiber block), an input fiber 71, an output fiber 72, an intermediate region 73, a waveguide 76, a polarizer 74, and magnetic field means 90 (in this embodiment a coil). Coupling means 75 has a coupling region 81 which is much longer than the other embodiments of the invention (see, e.g., FIG. 6). Input fiber 71 has a proximate end 86, a distal end 88 and a length $l_1$ along coupling region 81. Output fiber 72 has a proximate end 87, a distal end 89, and a length $l_2$ along coupling region 81. Each fiber also has a specific relative orientation of its polarization axis of symmetry. The axis of symmetry of input fiber 71 at proximate end 86 is perpendicular to the plan coupling region 81, and the axis of output fiber 72 at its proximate end 87 is turned over a $\pi/4$ angle with respect to the axis of input fiber 71 at its proximate end 86.

Intermediate region 73 is between proximate end 86 and proximate end 87 and has a length $l_3$ along coupling region 81. Intermediate region 73 is filled with an immersion material whose refractive index must not be higher then refractive index $n_{cl}$ of the fiber cladding 12. A section of the same fiber as 71 and 72 can also be used in intermediate region 73.

Because of the Faraday rotation inherent in a magnetic field H, the polarization of forward propagating light can be rotated at an angle of $\pi/4$ along length $l_3$ in waveguide 76 by choosing the appropriate field strength H. The light is then coupled to output fiber 72 along length $l_2$. Length $l_3$ is much greater then $l_1$ or $l_2$ so that the Faraday rotations at the distances $l_1$ and $l_2$ may be neglected. The polarization of the backward propagating light rotates an additional $\pi/4$ as it propagates back through waveguide 76. Therefore, the total rotation of the polarization of the backward propagating light with respect to the polarization of incoming forward propagating light in region of proximate end 86 becomes $\pi/2$.

A polarizer 74 is located at the boundary between coupling region 81 and waveguide 3 as it is shown in FIG. 7. Polarizer 74 may be fabricated as a strip of thin metallic film. If the light in input fiber 71 is polarized such that the direction of its electric field is perpendicular to coupling region 81, then after coupling to the highest order mode of waveguide 76 along length $l_1$, the light propagates through polarizer 74 with practically no attenuation. However, if the polarization of the light is rotated over the angle $\pi/2$, then the light is attenuated by polarizer 74 because its electric field is parallel to the plane of polarizer 74.

The electrodes 77, 78 and 79, 80 may be used to control the transfer of light across the boundary between waveguide 76 and the input/output fibers electro-optically, and also electrodes 91 and 92 can be used to support an adiabatic regime which avoids abrupt changes of mode propagation between different regions of the waveguide. Furthermore, a rib waveguide may be used as described before. A rib waveguide reduces the controlling voltages $V_1$, $V_2$, and $V_3$, and improves the transverse field confinement in the overlay waveguide.

Obviously, numerous modifications and variations of the present invention are possible in the light of the above teachings. It is therefore understood that within the scope of the appended claims, the invention may be practiced otherwise than as specifically described herein.

What is claimed is:

1. An all-fiber in line isolator for isolating backward propagating light from forward propagating light, said isolator comprises:
   a. an optical monomode fiber, said fiber has a core having a refractive index $n_1$ and a cladding having a refractive index $n_{cl}$, said fiber maintains a circular state of light polarization, said fiber has a coupling region wherein said cladding is partially removed;
   b. an optical multimode waveguide, said waveguide has parameters including a thickness d and a refractive index $n_2$, said refractive index $n_2$ is grater than said refractive index $n_{cl}$, said waveguide made from magneto-optical material exhibiting different magnitudes of refractive index $n_2+$ and $n_2-$ for circularly polarized light propagating in forward and backward directions respectively such that applying a magnetic field H along said waveguide and said coupling region facilitates a transfer of backward propagating light from said fiber to said waveguide with a minimal disturbance to forward propagating light, said parameters are chosen to effect a desired transfer point;
   c. coupling means for evanescently coupling said coupling region to said waveguide; and
   d. magnetic field means for applying said magnetic field H along said waveguide and said coupling region.

2. The device of claim 1 wherein said waveguide comprises electro-optical properties such that said transfer point depends upon the intensity of an electric field E applied across said waveguide and coupling region thereby facilitating tuning of said transfer point; and the device further comprises:
   e. electric field means for applying said electric field E across said waveguide and coupling region.

3. The device of claim 1 wherein said waveguide is a planar type.

4. The device of claim 1 wherein said waveguide is a rib waveguide.

5. The device of claim 1 further comprising:
   e. a grating, said grating is mounted to said coupling region of said fiber, said grating matches the propagation constant of backward propagating light in said fiber to the propagation constant of backward propagating light in said waveguide to effect said transfer point.

6. The device of claim 1 wherein said coupling means comprises a fiber block, said block has a V-groove and a polished surface substantially flush with said coupling region.

7. An all-fiber in line isolator for isolating backward propagating light from forward propagating fight, said fiber comprises:
   a. at least three birefringent monomode optical fibers, an input fiber, an intermediate fiber, and an output fiber, each fiber has a core having a refractive index $n_1$ and a cladding having a refractive index $n_{cl}$, each fiber maintains a linear state of light polarization, said intermediate fiber has a coupling region of length l wherein said cladding is partially removed, said intermediate fiber has a polarization beat length L which significantly exceeds said length l and is half the length of said intermediate fiber, each fiber has an orientation of polarization axis of symmetry, said axes of symmetry are successively rotated by an angle of $\pi/4$ relative to an adjacent fiber thereby generating a circular state of light polarization in said coupling region;
   b. an optical multimode waveguide, said waveguide has parameters including a thickness d and a refractive index $n_2$, said refractive index $n_2$ is greater than said refractive index $n_{cl}$, said waveguide has magneto-optical properties such that applying a magnetic field H along said waveguide and said coupling region facilitates a transfer of backward propagating light from said fiber to said waveguide with a minimal disturbance to forward propagating light, said parameters are chosen to effect a desired transfer point;
   c. coupling means for holding said fibers in position and for evanescently coupling said coupling region to said waveguide; and
   d. magnetic field means for applying said magnetic field H along said waveguide and said coupling region.

8. The device of claim 7 wherein said waveguide comprises electro-optical properties such that said transfer point depends upon the intensity of an electric field E applied across said waveguide and coupling region thereby facilitating tuning of said transfer point; and the device further comprises:
   e. electric field means for applying said electric field E across said waveguide and coupling region.

9. The device of claim 7 wherein said waveguide is a planar type.

10. The device of claim 7 wherein said waveguide is a rib waveguide.

11. The device of claim 7 further comprising:
    e. a grating, said grating is mounted to said coupling region of said fiber, said grating matches the propagation constant of backward propagating light in said fiber to the propagation constant of backward propagating light in said waveguide to effect said transfer point.

12. The device of claim 7 wherein said coupling means comprises a fiber block said block has a V-groove, said fibers are butt-joined together in said V-groove which is shaped to provide a large radius bending of aid fibers, said block has a polished surface substantially flush with said coupling region.

13. An all-fiber in line isolator for isolating backward propagating light from forward propagating light, said isolator comprises:

a. at least two birefringent optical fibers, an input fiber and an output fiber, each fiber has a distal end, a proximate end, a core, and a cladding having a refractive index of $n_{cl}$, each fiber guides light in a linear state of polarization, said proximate ends of said input and output fibers comprise a coupling region along lengths $l_1$ and $l_2$ respectively wherein said cladding is partially removed, each fiber has a specific orientation of polarization axis of symmetry, said axis of said input fiber is perpendicular to the plane of said coupling region, said axis of said output fiber is turned over the angle of $\pi/4$ relative to plane of said coupling region and over the angle of $\pi/2$ relative to said axis of said input fiber;

b. an optical waveguide, said waveguide has magneto-optical properties and parameters which include a thickness d and a refractive index $n_2$ being greater than said refractive index $n_{cl}$, said parameters are chosen to facilitate a transfer of forward and backward propagating light from said fibers to said waveguide;

c. coupling means for evanescently coupling said fibers to said waveguide, for supporting said fibbers, and for defining an intermediate region between said proximate ends of said input and output fibers, said intermediate region has a length $l_3$ said length $l_3$ is much greater than said lengths $l_1$ and $l_2$;

d. an immersion material, said intermediate region contains said immersion material, and said immersion material has a refractive index not greater than said refractive index $n_{cl}$;

e. magnetic field means for applying said magnetic field H along said coupling region, said magnetic field H rotates the polarization of forward propagating light in said intermediate region by an angle of $\pi/4$ relative to said coupling region, said magnetic field H further rotates the polarization of backward propagating light in said intermediate region by an additional angle of $\pi/4$ for a total rotation of $\pi/2$ relative to the light polarization in said input fiber; and f. a polarizer, said polarizer interfaces between said coupling region and said waveguide, said polarizer transmits forward propagating light having its polarization perpendicular to the plane of said polarizer and absorbs backward propagating light having its polarization rotated by an angle of $\pi/2$ relative to the plane of said polarizer.

14. The device of claim 13 wherein said waveguide comprises electro-optical properties such that said transfer point depends upon the intensity of an electric field E applied across said waveguide and coupling region thereby facilitating tuning of said transfer point; and the device further comprises:

g. electric field means for applying said electric field E across said waveguide and coupling region.

15. The device of claim 13 wherein said waveguide is a planar type.

16. The device of claim 13 wherein said waveguide is a rib waveguide.

17. The device of claim 13 further comprising:

g. a grating, said grating is mounted to said coupling region of said fiber, said grating matches the propagation constant of propagating light in said fiber to propagating constant of propagating light in said waveguide to effect said transfer point.

18. The device of claim 13 wherein said coupling means comprises a fiber block, said block has a V-groove and a polished surface substantially flush with said coupling region.

19. The device of claim 13 wherein said immersion material comprises an intermediate fiber of substantially similar consistency to said fibers.

\* \* \* \* \*